US012795794B2

(12) United States Patent
Peng

(10) Patent No.: US 12,795,794 B2
(45) Date of Patent: Nov. 10, 2026

(54) LIGHT-EMITTING DIODE LAMP AND LIGHT-EMITTING DIODE LIGHT STRING

(71) Applicant: SEMISILICON TECHNOLOGY CORP., New Taipei City (TW)

(72) Inventor: Wen-Chi Peng, New Taipei City (TW)

(73) Assignee: SEMISILICON TECHNOLOGY CORP., New Taipei City (TW)

( * ) Notice: Subject to any disclaimer, the term of this patent is extended or adjusted under 35 U.S.C. 154(b) by 41 days.

(21) Appl. No.: 19/086,390

(22) Filed: Mar. 21, 2025

(65) Prior Publication Data

US 2026/0239506 A1 Aug. 13, 2026

(30) Foreign Application Priority Data

Feb. 13, 2025 (TW) ................................ 114105358

(51) Int. Cl.
*H05B 45/34* (2020.01)
*H05B 45/54* (2020.01)

(52) U.S. Cl.
CPC ............ *H05B 45/34* (2020.01); *H05B 45/54* (2020.01)

(58) Field of Classification Search
CPC ................................ H05B 45/34; H05B 45/54
See application file for complete search history.

(56) References Cited

U.S. PATENT DOCUMENTS

| | | | | |
|---|---|---|---|---|
| 8,461,769 B2 * | 6/2013 | Shiu | H05B 45/46 315/185 S |
| 11,546,981 B1 * | 1/2023 | Peng | H05B 47/155 |
| 2010/0320939 A1 * | 12/2010 | Lai | H05B 45/18 315/309 |

* cited by examiner

*Primary Examiner* — Minh Tran
(74) *Attorney, Agent, or Firm* — Studebaker Brackett PLLC

(57) ABSTRACT

A light-emitting diode (LED) lamp includes a working circuit and a voltage clamping device. The working circuit is electrically connected between a working voltage and a ground terminal, and used to provide a power control and/or a lighting control for the LED lamp. The voltage clamping device is connected to the working circuit in parallel, and the voltage clamping device includes a switch. The switch is electrically connected between the working voltage and the ground terminal. After the LED lamp is powered up to operate, when the working voltage is increased to exceed a reference voltage, the switch is controlled to be turned on to form a conduction path between the working voltage and the ground terminal, and a large current flows through the conduction path so that the voltage clamping device clamps the working voltage of supplying power to the working circuit.

14 Claims, 6 Drawing Sheets

LIGHT-EMITTING DIODE LAMP AND LIGHT-EMITTING DIODE LIGHT STRING

CROSS-REFERENCE TO RELATED APPLICATIONS

This application claims benefit of priority to Taiwanese Patent Application No. 114105358 filed Feb. 13, 2025, the entire contents of which are incorporated herein by reference.

BACKGROUND

Technical Field

The present disclosure relates to a light-emitting diode (LED) lamp and a LED light string, and particularly to a LED lamp and a LED light string with active voltage clamping.

Description of Related Art

The statements in this section merely provide background information related to the present disclosure and do not necessarily constitute prior art.

Since light-emitting diode (LED) has the advantages of high luminous efficiency, low power consumption, long life span, fast response, high reliability, etc., LEDs have been widely used in lighting fixtures or decorative lighting, such as Christmas tree lighting, lighting effects of sport shoes, etc. by connecting light bars or light strings in series, parallel, or series-parallel.

Take the festive light for example. Basically, a complete LED lamp includes an LED light string having a plurality of LEDs and a drive unit for driving the LEDs. The drive unit is electrically connected to the LED light string, and controls the LEDs by a pixel control manner or a synchronous manner by providing the required power and the control signal having light data to the LEDs, thereby implementing various lighting output effects and changes of the LED lamp.

In the DC parallel-series light string application, the voltage as the light string is further back will be lower as the number of lights and the length of the wire increases. Although current lamps have been designed with constant current and bypass current, the current flowing through the lamp at any one time remains constant to acquire a fixed impedance and evenly distribute the voltage. However, according to Ohm's law (V-IR, where V is voltage, I is current, and R is impedance), a constant current does not necessarily mean a constant impedance. In case the impedance of a certain lamp decreases, causing the voltage to drop suddenly, resulting in an increase in the voltage of other lamps, and therefore a Zener diode can be added to each lamp to clamp its voltage to keep the operating voltage stable.

In addition, in the automatically sequenced light string, when a certain lamp changes through current during sequencing, it is hoped that the controller can detect the voltage change. However, due to the series connection structure, other lamps will increase or decrease the voltage to offset the voltage change of the lamp, resulting in no voltage change at the controller end or the voltage change being offset and becoming very small and undetectable. Therefore, adding a Zener diode can solve this problem, that is, the Zener diode can clamp the lamp at a certain fixed voltage without allowing it to increase too much, thereby offsetting the voltage change to be detected.

However, the problem is that generally the Zener diode has a fixed conduction voltage. As mentioned above, the voltage will be lower as the light string is further back. When the voltage is low, the Zener diode conduction voltage remains fixed, thus rendering the Zener diode ineffective. Therefore, Zener diodes are not suitable for operating environments with large load changes and high currents.

Therefore, how to design a LED lamp and a LED light string, and particularly to a LED lamp and a LED light string with active voltage clamping that the turned-on state voltage can be adjusted actively according to the different working voltages and to solve the problems and technical bottlenecks in the existing technology has become a critical topic in this field.

SUMMARY

An objective of the present disclosure is to provide a light-emitting diode (LED) lamp. The LED lamp includes a working circuit and a voltage clamping device. The working circuit is electrically connected between a working voltage and a ground terminal, and provides a power control and/or a lighting control for the LED lamp. The voltage clamping device is connected to the working circuit in parallel, and the voltage clamping device includes a switch. The switch is electrically connected between the working voltage and the ground terminal. After the LED lamp is powered up to operate, when the working voltage is increased to exceed a reference voltage, the switch is controlled to be turned on to form a conduction path between the working voltage and ground terminal, and a large current flows through the conduction path so that the voltage clamping device clamps the working voltage of supplying power to the working circuit.

In one embodiment, the voltage clamping device includes a capacitor, a first amplifier, and the switch. The capacitor receives the working voltage and charged by the working voltage to build a capacitor voltage, and the capacitor voltage is recorded as the reference voltage after the working voltage is regulated. The first amplifier receives the reference voltage and a divided voltage corresponding to the working voltage, and compares the divided voltage with the reference voltage to generate a switch signal. The switch receives the switch signal and controlled by the switch signal. When the working voltage increases and exceeds the reference voltage, the switch signal controls the switch to be turned on so that a large current flows through the conduction path.

In one embodiment, the voltage clamping device further includes a first switch. The first switch is coupled to the capacitor in series, and controlled by a control signal provided by the working circuit. When the control signal turns on the first switch, the working voltage charges the capacitor to build the capacitor voltage.

In one embodiment, the voltage clamping device further includes a voltage-dividing resistor network. The voltage-dividing resistor network receives the working voltage, and divides the working voltage to provide the divided voltage.

In one embodiment, the voltage clamping device further includes a second amplifier. The second amplifier receives the capacitor voltage, and provides the capacitor voltage as the reference voltage after the working voltage is regulated.

In one embodiment, the voltage clamping device includes an analog-to-digital conversion circuit, a third amplifier, and the switch. The analog-to-digital conversion circuit receives the working voltage, and records the working voltage as the reference voltage after the working voltage is regulated. The third amplifier receives the reference voltage and a divided voltage corresponding to the working voltage, and compares the divided voltage with the reference voltage to generate a switch signal. The switch receives the switch signal and controlled by the switch signal. When the working voltage increases and exceeds the reference voltage, the switch signal controls the switch to be turned on so that a large current flows through the conduction path.

In one embodiment, the voltage clamping device further includes a voltage-dividing resistor network. The voltage-dividing resistor network receives the working voltage, and divides the working voltage to provide the divided voltage.

In one embodiment, the voltage clamping device includes a constant-voltage circuit, a first comparator, a second comparator, a register, and the switch. The constant-voltage circuit receives the working voltage, and records he working voltage as the reference voltage after the working voltage is regulated. The first comparator receives the reference voltage and a first divided voltage corresponding to the working voltage, and compares the first divided voltage with the reference voltage to generate a first register signal. The second comparator receives the reference voltage and a second divided voltage corresponding to the working voltage, and compares the second divided voltage with the reference voltage to generate a second register signal. The register receives the first register signal and the second register signal, and generates a register output signal according to the first register signal and the second register signal. The switch receives the register output signal and controlled by the register output signal. When the working voltage increases and exceeds the reference voltage, the register output signal controls the switch to be turned on so that a large current flows through the conduction path.

In one embodiment, the voltage clamping device further includes a first voltage-dividing resistor network and a second voltage-dividing resistor network. The first voltage-dividing resistor network receives the working voltage, and divides the working voltage to provide the first divided voltage. The second voltage-dividing resistor network receives the working voltage, and divides the working voltage to provide the second divided voltage.

In one embodiment, the voltage clamping device further includes a fourth amplifier. The fourth amplifier receives the register output signal and a second reference voltage, and compares the register output signal with the reference to generate a switch signal to control the switch.

In one embodiment, the voltage clamping device further includes a third voltage-dividing resistor network. The third voltage-dividing resistor network receives the working voltage, and divides the working voltage to provide the second reference voltage.

In one embodiment, the voltage clamping device further an analog switch. The analog switch receives the register output signal and the switch signal generated by the fourth amplifier. When the register output signal enables the analog switch, the analog switch outputs the switch signal to control the switch.

In one embodiment, the voltage clamping device further includes an inverter and a second switch. The inverter is coupled to the register, and inverts the register output signal into a second switch signal. The second switch is coupled to the inverter and the switch, and the second switch is controlled by the second switch signal.

In one embodiment, when the working voltage is decreased to be below a reference voltage, the second switch signal turns on the second switch so that the current flowing through the conduction path to decrease significantly until it reaches zero.

Another objective of the present disclosure is to provide a LED light string. The LED light string includes a plurality of LED lamps connected in series. Each LED lamp includes a working circuit and a voltage clamping device. The working circuit is electrically connected between a working voltage and a ground terminal, and provides a power control and/or a lighting control for the LED lamp. The voltage clamping device is connected to the working circuit in parallel, and the voltage clamping device includes a switch. The switch is electrically connected between the working voltage and the ground terminal. After the LED light string is powered up to operate, when the working voltage of each LED lamp of the LED light string is increased to exceed a reference voltage, the switch of the LED lamp is controlled to be turned on to form a conduction path between the working voltage and ground terminal, and a large current flows through the conduction path so that the voltage clamping device clamps the working voltage of supplying power to the working circuit of the LED lamp.

It is to be understood that both the foregoing general description and the following detailed description are exemplary, and are intended to provide further explanation of the present disclosure as claimed. Other advantages and features of the present disclosure will be apparent from the following description, drawings, and claims.

BRIEF DESCRIPTION OF DRAWINGS

The present disclosure can be more fully understood by reading the following detailed description of the embodiment, with reference made to the accompanying drawing as follows.

DETAILED DESCRIPTION

Figure 1:
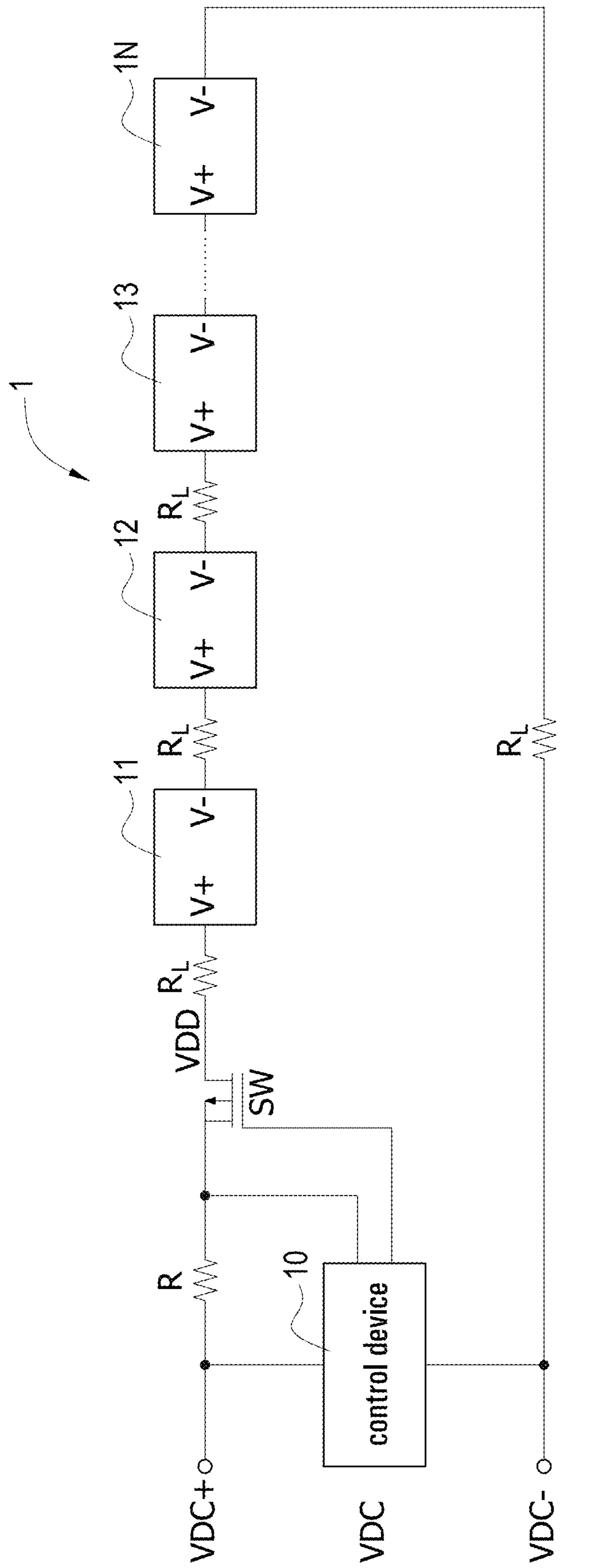
FIG. 1 is a block circuit diagram of a light-emitting diode (LED) light string according to the present disclosure.

Reference will now be made to the drawing figures to describe the present disclosure in detail. It will be understood that the drawing figures and exemplified embodiments of present disclosure are not limited to the details thereof.

Please refer to FIG. 1, which shows a block circuit diagram of a light-emitting diode (LED) light string according to the present disclosure. The LED light string shown in FIG. 1 includes a plurality of LED lamps 11, 12, 13, . . . , 1N connected in series. As shown in FIG. 1, the LED light string 1 receives a DC power source VDC, and includes a control device 10 and the plurality of LED lamps 11, 12, 13, . . . , 1N. The control device 10 is connected between a positive voltage terminal VDC+ and a negative voltage terminal VDC− of the DC power source VDC.

For each LED lamp 11, 12, 13, . . . , 1N, due to the non-ideal characteristics of its components, such as the impedance difference of three primary color (RGB) LEDs of the LED lamp, the light string will produce a larger voltage drop (voltage change) under a larger load. Therefore, if the impedance of one lamp decreases, it will cause a sudden drop in voltage, causing the voltage of other lamps to increase, thereby affecting the operation of other lamps.

Figure 2:
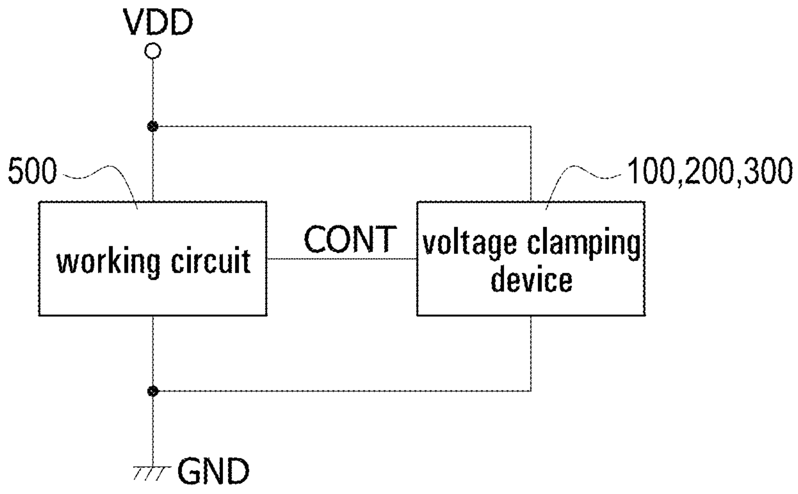
FIG. 2 is a block diagram of a LED lamp having a voltage clamping device according to the present disclosure.

As shown in FIG. 2, each LED lamp 11, 12, 13, . . . , 1N includes a working circuit 500 and a voltage clamping device 100, 200, 300. The working circuit 500 may include, for example but not limited to, a register, a sequencing circuit, a sorting circuit, a control circuit, etc., for providing power control and/or lighting control to the corresponding LED lamps 11, 12, 13, . . . , 1N. The voltage clamping device 100, 200, 300 is coupled to the working circuit 500, and the working circuit 500 and the voltage clamping devices 100, 200, 300 are electrically connected between a DC voltage VDD and a ground terminal GND (in this embodiment, the ground terminal GND is taken as an example, or in other embodiments, it may be a negative voltage terminal). Compared with diodes for voltage clamping in prior art, it is a passive component and will not accordingly change according to the voltage drop change of the DC voltage VDD on each LED lamp 11, 12, 13, . . . , 1N. Therefore, the LED lamps 11, 12, 13, . . . , 1N at the rear end of the series light string may fail to activate voltage regulation (i.e., voltage regulation failure).

Therefore, the present disclosure achieves the effect of voltage clamping by using the voltage clamping device 100, 200, 300 with active components. Therefore, no matter how the voltage drop of the DC voltage VDD (i.e., the working voltage VDD, referred to as such below) on each LED lamp 11, 12, 13, . . . , 1N changes, the voltage clamping effect of the working circuit 500 can be achieved by controlling the active components.

Figure 3A:
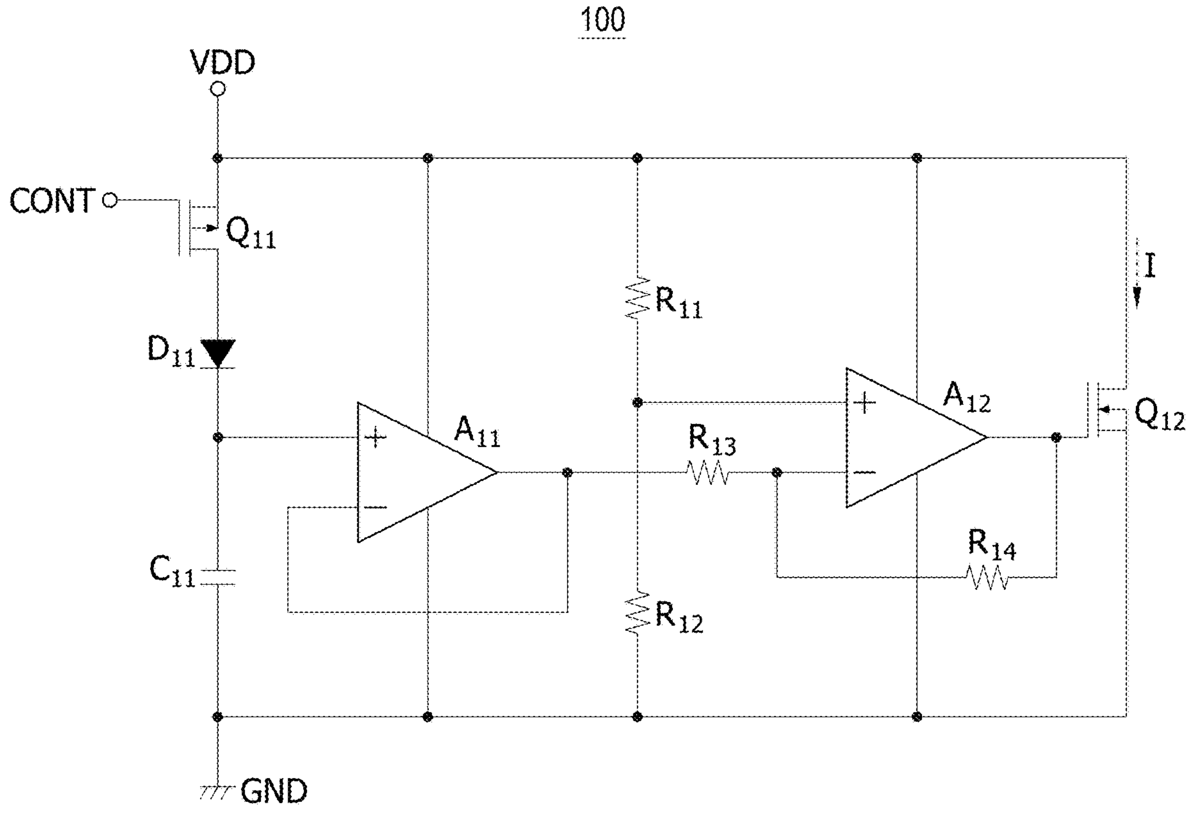
FIG. 3A is a circuit diagram of the voltage clamping device according to a first embodiment of the present disclosure.

Please refer to FIG. 3A, which shows a circuit diagram of the voltage clamping device according to a first embodiment of the present disclosure. The voltage clamping device 100 mainly includes a capacitor $C_{11}$, a first switch $Q_{11}$, a second switch $Q_{12}$, a first amplifier $A_{12}$, a second amplifier $A_{11}$, and a voltage-dividing resistor network $R_{11}$, $R_{12}$.

The voltage clamping device 100 receives a control signal CONT provided by the working circuit 500, and is controlled by the control signal CONT, that is, the control signal CONT is used to enable or disable the voltage regulation function of the voltage clamping device 100. Specifically, the control signal CONT is used to control the first switch $Q_{11}$. In this embodiment, the first switch $Q_{11}$ is a N-type MOSFET, and a gate of the first switch $Q_{11}$ receives the control signal CONT and therefore the first switch $Q_{11}$ is controlled by the control signal CONT. A drain of the first switch $Q_{11}$ receives the working voltage VDD and powered by the working voltage VDD.

When the control signal CONT turns on the first switch Q11, the working voltage VDD powers up the voltage clamping device 100. When the working voltage VDD charges the capacitor $C_{11}$ through a forward power supply path of a diode $D_{11}$, the voltage across the capacitor $C_{11}$ (i.e., the capacitor voltage) gradually increases. Therefore, the diode $D_{11}$ and the capacitor $C_{11}$ form a voltage source as an input power source of the second amplifier $A_{11}$.

A positive input terminal (or referred to as "non-inverting input terminal") of the second amplifier $A_{11}$ is connected to the diode $D_{11}$ and the capacitor $C_{11}$ to receive the capacitor voltage, and a negative input terminal (or referred to as "inverting input terminal") is connected to an output terminal of the second amplifier $A_{11}$. Therefore, the second amplifier $A_{11}$ forms a voltage follower (or referred to as "unity gain buffer") having the characteristics of high input impedance and low output impedance, and is used for impedance matching and circuit buffering. Therefore, the capacitor voltage is amplified by the non-inverting amplifier of the second amplifier $A_{11}$ with a voltage gain of 1 and outputted to the output terminal of the second amplifier $A_{11}$. Furthermore, the output voltage of the second amplifier $A_{11}$ is provided to a negative input terminal of the first amplifier $A_{12}$ through a resistor $R_{13}$ and received as a reference voltage of the first amplifier $A_{12}$.

A positive input terminal of the first amplifier $A_{12}$ is connected to the voltage-dividing resistor network $R_{11}$, $R_{12}$, and the voltage-dividing resistor network $R_{11}$, $R_{12}$ includes a first resistor $R_{11}$ and a second resistor $R_{12}$ for receiving the working voltage VDD and dividing the working voltage VDD. Therefore, the divided voltage $$\text{(i.e., the voltage received by the positive input terminal of the first apmlifier } A_{12}) = V_{DD} \times \frac{R_{12}}{R_{11} + R_{12}}.$$

When the working voltage VDD increases, the voltage divided by the first resistor $R_{11}$ and the second resistor $R_{12}$ (i.e., the voltage received by the positive input terminal of the first amplifier $A_{12}$) also increases accordingly. Similarly, when the working voltage VDD decreases, the voltage divided by the first resistor $R_{11}$ and the second resistor $R_{12}$ also decreases accordingly. Since the first amplifier $A_{12}$ receives the divided voltage (through the positive input terminal) and the reference voltage (through the negative input terminal) respectively, and is used to amplify the reference voltage, wherein the amplified gain value is related to a resistor $R_{14}$, a resistor $R_{13}$, and the divided voltage, when the working voltage VDD is larger, the divided voltage is larger so that the output terminal of the first amplifier $A_{12}$ outputs a high-level signal. On the contrary, when the working voltage VDD is smaller, the divided voltage is smaller so that the output terminal of the first amplifier $A_{12}$ outputs a low-level signal. In this embodiment, the second switch $Q_{12}$ is a P-type MOSFET, a gate of the second switch $Q_{12}$ receives the signal outputted by the first amplifier $A_{12}$, and a drain of the second switch $Q_{12}$ receives the working voltage VDD and a source of the second switch $Q_{12}$ is connected to the ground terminal GND.

Figure 3B:
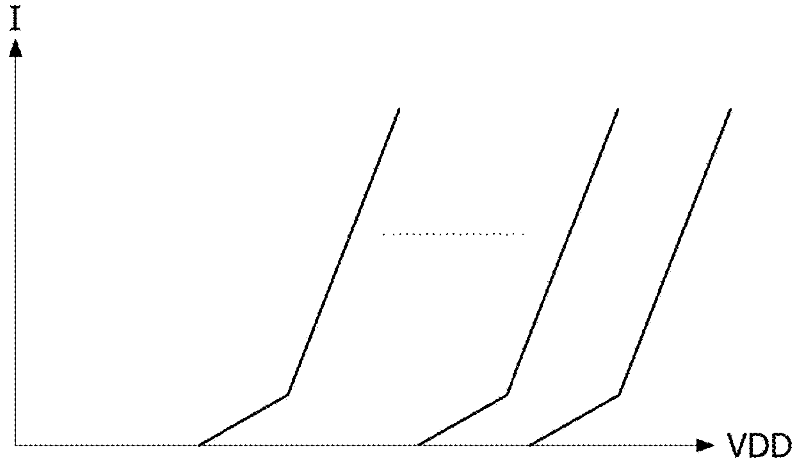
FIG. 3B is a schematic characteristics diagram of a working voltage and a current on a conduction path of FIG. 3A.

Therefore, when the working voltage VDD is too large, the output terminal of the first amplifier $A_{12}$ outputs a high-level signal to control the second switch $Q_{12}$ to be turned on. Therefore, a path with extremely low impedance is formed between the working voltage VDD and the ground terminal GND, thereby generating a large current I on the conduction path to achieve the purpose of clamping the working voltage VDD. Please refer to FIG. 3B, which shows a schematic characteristics diagram of a working voltage and a current on a conduction path of FIG. 3A.

In summary, the first embodiment disclosed in FIG. 3A of the present disclosure is implemented by the capacitor $C_{11}$.

After the working voltage VDD is powered on and the first switch Qu is turned on by the control signal CONT for a period of time until the working voltage VDD is stable, that is, when the capacitor voltage of the capacitor $C_{11}$ reaches a fixed value, the capacitor $C_{11}$ is used to record the fixed capacitor voltage as the voltage value of the working voltage VDD. After the voltage value of the working voltage VDD is recorded, the first switch $Q_{11}$ is turned off by the control signal CONT so that a charging path of the capacitor $C_{11}$ is disconnected and the voltage value of the working voltage VDD is used as a reference voltage to provide to the first amplifier $A_{12}$.

When the working voltage VDD is too large, the output terminal of the first amplifier $A_{12}$ outputs a high-level signal to turn on the second switch $Q_{12}$ so that the path between the working voltage VDD and the ground terminal GND is made to flow a large current I, thereby clamping the working voltage VDD to the voltage value of the originally recorded working voltage VDD. Therefore, once the working voltage VDD is too large, the voltage clamping device 100 can clamp the working voltage VDD and regulate it at the desired working voltage VDD.

Figure 4A:
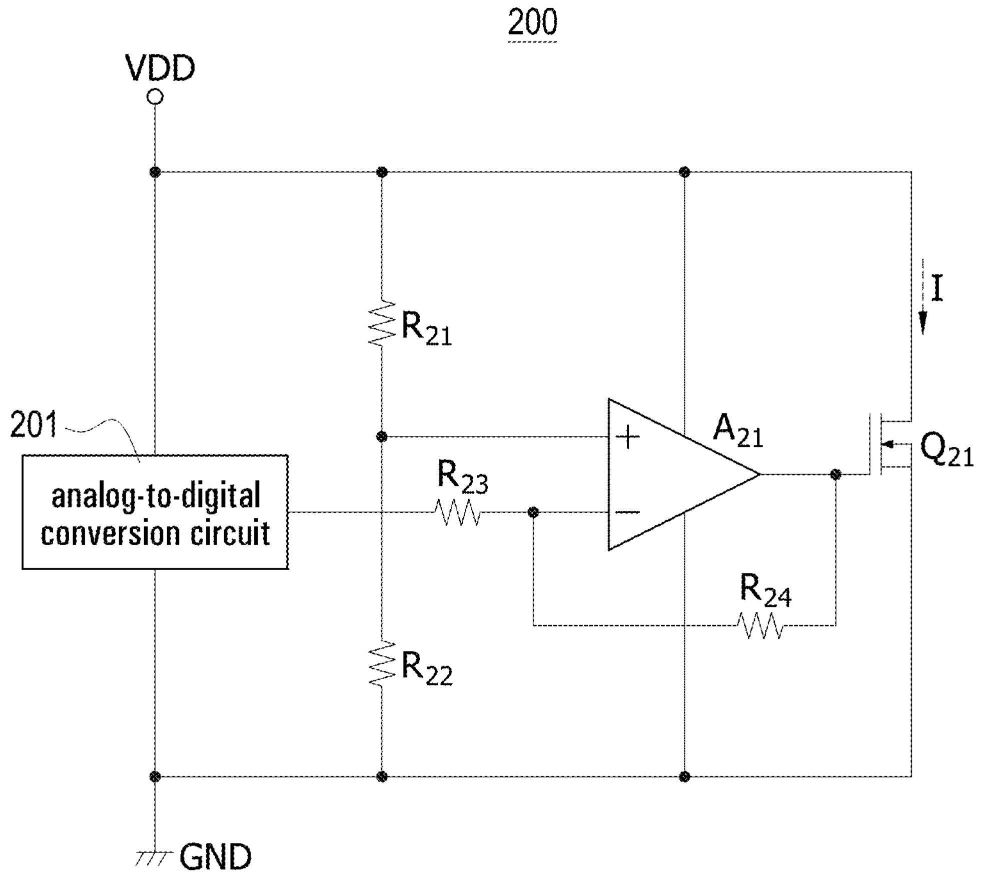
FIG. 4A is a circuit diagram of the voltage clamping device according to a second embodiment of the present disclosure.

Please refer to FIG. 4A, which shows a circuit diagram of the voltage clamping device according to a second embodiment of the present disclosure. The voltage clamping device 200 mainly includes an analog-to-digital conversion circuit 201, a third switch $Q_{21}$, a third amplifier $A_{21}$, and a voltage-dividing resistor network $R_{21}$, $R_{22}$. Compared to the first embodiment of FIG. 3A, this embodiment omits the first switch $Q_{11}$, the diode $D_{11}$, the capacitor $C_{11}$, and the second amplifier $A_{11}$, and the analog-to-digital conversion circuit 201 is used to directly replace them. That is, the analog-to-digital conversion circuit 201 may be used to achieve the operations and functions of the above-mentioned first switch $Q_{11}$, diode $D_{11}$, capacitor $C_{11}$, and second amplifier $A_{11}$.

The analog-to-digital conversion circuit 201 directly receives the working voltage VDD and converts the analog working voltage VDD into a digital voltage signal. It can not only replace the turning-on/turning-off control of the first switch Qui and the repeated charging and discharging operations of the capacitor $C_{11}$ in the first embodiment, but also replace the voltage follower operation provided by the second amplifier $A_{11}$. Therefore, the analog-to-digital conversion circuit 201 directly sets the voltage value of the working voltage VDD to be maintained through a digital control and records the voltage value. Furthermore, the analog-to-digital conversion circuit 201 provides a reference voltage for the third amplifier $A_{21}$.

A positive input terminal of the third amplifier $A_{21}$ is connected to the voltage-dividing resistor network $R_{21}$, $R_{22}$, and the voltage-dividing resistor network $R_{21}$, $R_{22}$ includes a third resistor $R_{21}$ and a fourth resistor $R_{22}$ for receiving the working voltage VDD and dividing the working voltage VDD. Therefore, the divided voltage $$\text{(i.e., the voltage received by the positive input terminal of the third apmlifier } A_{21}) = V_{DD} \times \frac{R_{22}}{R_{21} + R_{22}}.$$

When the working voltage VDD increases, the voltage divided by the third resistor $R_{21}$ and the fourth resistor $R_{22}$ (i.e., the voltage received by the positive input terminal of the third amplifier $A_{21}$) also increases accordingly. Similarly, when the working voltage VDD decreases, the voltage divided by the third resistor $R_{21}$ and the fourth resistor $R_{22}$ also decreases accordingly. Since the third amplifier $A_{21}$ receives the divided voltage (through the positive input terminal) and the reference voltage (through the negative input terminal) respectively, and is used to amplify the reference voltage, wherein the amplified gain value is related to a resistor $R_{24}$, a resistor $R_{23}$, and the divided voltage, when the working voltage VDD is larger, the divided voltage is larger so that the output terminal of the third amplifier $A_{21}$ outputs a high-level signal. On the contrary, when the working voltage VDD is smaller, the divided voltage is smaller so that the output terminal of the third amplifier $A_{21}$ outputs a low-level signal. In this embodiment, the third switch $Q_{21}$ is a P-type MOSFET, a gate of the third switch $Q_{21}$ receives the signal outputted by the third amplifier $A_{21}$, and a drain of the third switch $Q_{21}$ receives the working voltage VDD and a source of the third switch $Q_{21}$ is connected to the ground terminal GND.

Figure 4B:
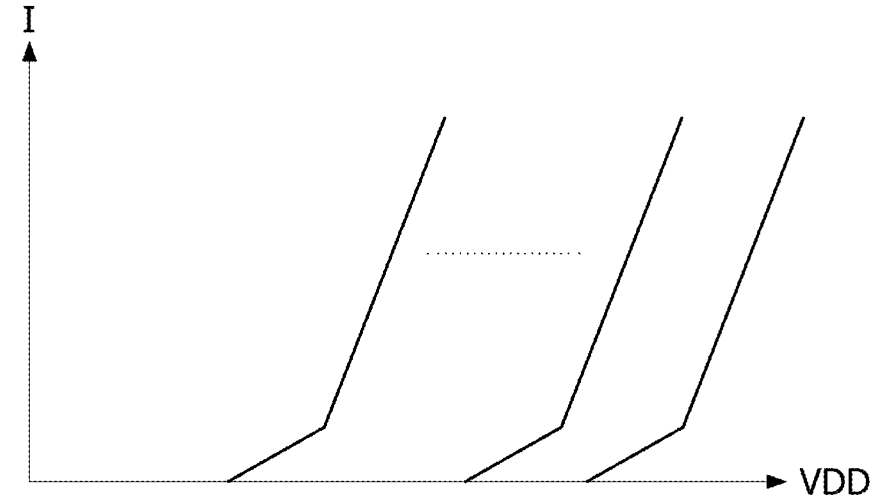
FIG. 4B is a schematic characteristics diagram of the working voltage and the current on the conduction path of FIG. 4A.

Therefore, when the working voltage VDD is too large, the output terminal of the third amplifier $A_{21}$ outputs a high-level signal to control the third switch $Q_{21}$ to be turned on. Therefore, a path with extremely low impedance is formed between the working voltage VDD and the ground terminal GND, thereby generating a large current I on the conduction path to achieve the purpose of clamping the working voltage VDD. Please refer to FIG. 4B, which shows a schematic characteristics diagram of the working voltage and the current on the conduction path of FIG. 4A.

In summary, the first embodiment disclosed in FIG. 4A of the present disclosure is implemented by the analog-to-digital conversion circuit 201. After the working voltage VDD is powered on for a period of time until it reaches stable, the voltage value (digital voltage value) of the working voltage VDD to be clamped and regulated is set and recorded by the analog-to-digital conversion circuit 201. After recording the voltage value of the working voltage VDD, the voltage value is used as a reference voltage to be provided to the third amplifier $A_{21}$.

When the working voltage VDD is too large, the output terminal of the third amplifier $A_{21}$ outputs a high-level signal to turn on the third switch $Q_{21}$ so that the path between the working voltage VDD and the ground terminal GND is made to flow a large current I, thereby clamping the working voltage VDD to the voltage value of the originally recorded working voltage VDD. Therefore, once the working voltage VDD is too large, the voltage clamping device 200 can clamp the working voltage VDD and regulate it at the desired working voltage VDD.

In the second embodiment, the analog-to-digital conversion circuit 201 is used to realize the recording and setting of the voltage value of the working voltage VDD, which will not be affected by the voltage change during the operation process, and thus has better stability and accuracy.

Figure 5A:
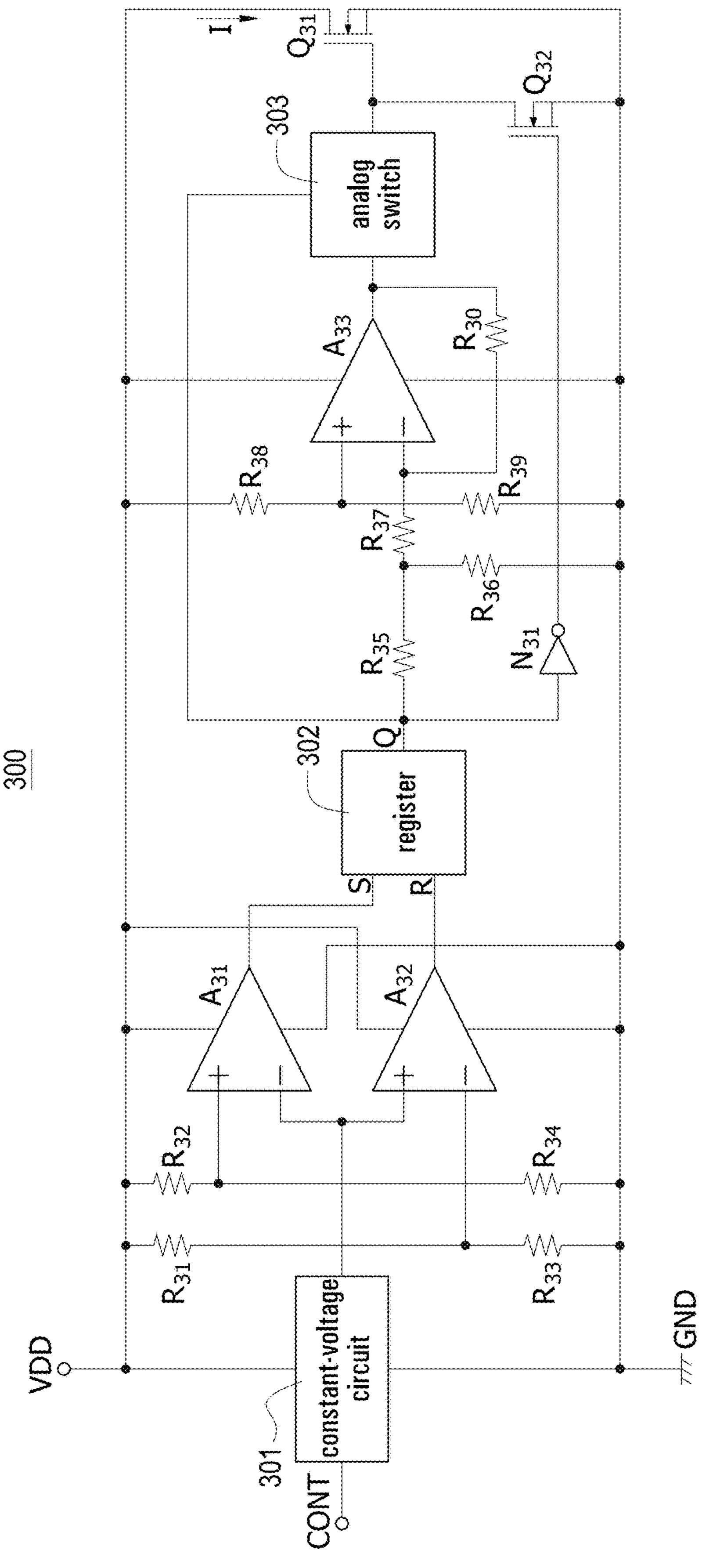
FIG. 5A is a circuit diagram of the voltage clamping device according to a third embodiment of the present disclosure.

Please refer to FIG. 5A, which shows a circuit diagram of the voltage clamping device according to a third embodiment of the present disclosure. The voltage clamping device 300 mainly includes a constant-voltage circuit 301, a first voltage-dividing resistor network $R_{31}$, $R_{33}$, a second voltage-dividing resistor network $R_{32}$, $R_{34}$, a first comparator $A_{31}$, a second comparator $A_{32}$, a register 302, a fourth amplifier $A_{33}$, an analog switch 303, a fourth switch $Q_{31}$, a fifth switch $Q_{32}$, and a third voltage-dividing resistor network $R_{38}$, $R_{39}$.

The constant-voltage circuit 301 receives a control signal CONT provided by the working circuit 500, and is controlled by the control signal CONT, that is, the control signal CONT is used to enable or disable the voltage regulation function of the voltage clamping device 300. In one embodiment, the constant-voltage circuit 301 may be, but not limited to, a simple capacitor component, a super capacitor component, a linear regulator, a switching regulator, etc.

After the working voltage VDD is powered on for a period of time until it reaches stable, the voltage value of the working voltage VDD to be clamped and regulated is set and recorded by the constant-voltage circuit 301. After recording the voltage value of the working voltage VDD, the voltage value is used as a reference voltage to be provided to the first comparator $A_{31}$ and the second comparator $A_{32}$.

A positive input terminal of the first comparator $A_{31}$ is connected to the second voltage-dividing resistor network $R_{32}$, $R_{34}$, and the second voltage-dividing resistor network $R_{32}$, $R_{34}$ includes a seventh resistor $R_{32}$ and an eighth resistor $R_{34}$ for receiving the working voltage VDD and dividing the working voltage VDD. Therefore, a second divided voltage $$\text{(i.e., the voltage received by the positive input terminal of the first comparator } A_{31}) = V_{DD} \times \frac{R_{34}}{R_{32}+R_{34}}.$$

A negative input terminal of the second comparator $A_{32}$ is connected to the first voltage-dividing resistor network $R_{31}$, $R_{33}$, and the first voltage-dividing resistor network $R_{31}$, $R_{33}$ includes a fifth resistor $R_{31}$ and a sixth resistor $R_{33}$ for receiving the working voltage VDD and dividing the working voltage VDD. Therefore, a first divided voltage $$\text{(i.e., the voltage received by the negative input terminal of the second comparator } A_{32}) = V_{DD} \times \frac{R_{33}}{R_{31}+R_{33}}.$$

When the working voltage VDD increases (especially increases rapidly, or increases instantaneously, the same below, no special emphasis is given), the voltage divided by the seventh resistor $R_{32}$ and the eighth resistor $R_{34}$ (i.e., the voltage received by the positive input terminal of the first comparator $A_{31}$) also increases accordingly. Similarly, when the working voltage VDD decreases, the voltage divided by the seventh resistor $R_{32}$ and the eighth resistor $R_{34}$ also decreases accordingly. Furthermore, when the working voltage VDD increases, the voltage divided by the fifth resistor $R_{31}$ and the sixth resistor $R_{33}$ (i.e., the voltage received by the negative input terminal of the second comparator $A_{32}$) also increases accordingly. Similarly, when the working voltage VDD decreases, the voltage divided by the fifth resistor $R_{31}$ and the sixth resistor $R_{33}$ also decreases accordingly.

Since the first comparator $A_{31}$ receives the second divided voltage (through the positive input terminal) and the reference voltage (through the negative input terminal) respectively, and compares the second divided voltage with the reference voltage, when the second divided voltage is greater than the reference voltage, the output terminal of the first comparator $A_{31}$ outputs a high-level signal. On the contrary, when the second divided voltage is less than the reference voltage, the output terminal of the first comparator $A_{31}$ outputs a low-level signal. Furthermore, since the second comparator $A_{32}$ receives the first divided voltage (through the negative input terminal) and the reference voltage (through the positive input terminal) respectively, and compares the first divided voltage with the reference voltage, when the first divided voltage is greater than the reference voltage, the output terminal of the second comparator $A_{32}$ outputs a low-level signal. On the contrary, when the first divided voltage is less than the reference voltage, the output terminal of the second comparator $A_{32}$ outputs a high-level signal.

Figure 5B:
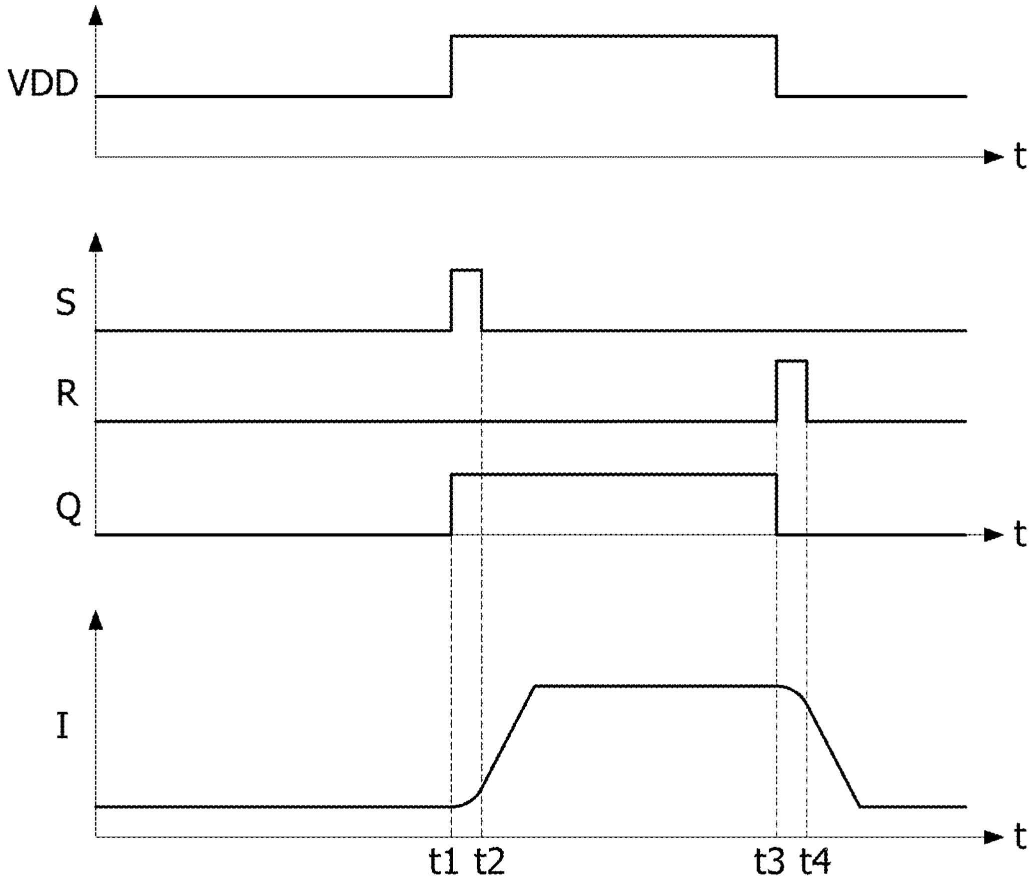
FIG. 5B is a schematic diagram of an operating voltage, a current of the conduction path, and register signals of FIG. 5A.

Please refer to FIG. 5B, which shows a schematic diagram of an operating voltage, a current of the conduction path, and register signals of FIG. 5A. When the working voltage VDD increases (especially increases rapidly) at time t1 so that the second divided voltage is greater than the reference voltage and the first divided voltage is greater than the reference voltage, the output terminal of the first comparator $A_{31}$ outputs a high-level signal, and the output terminal of the second comparator $A_{32}$ outputs a low-level signal. In this embodiment, the register 302 is implemented by an RS flip-flop. In this condition, the first comparator $A_{31}$ outputs a high-level signal to the S (set) input terminal of the register 302, and the second comparator $A_{32}$ outputs a low-level signal to the R (reset) input terminal of the register 302.

Since the S (set) input terminal of the register 302 receives the high-level signal and the R (reset) input terminal receives the low-level signal, the Q output terminal of the register 302 generates a high-level signal (as shown in FIG. 5B), and the high-level signal is provided to the analog switch 303 and an inverter $N_{31}$ respectively. The high-level signal generates a low-level signal through the inverter $N_{31}$ to control the fifth switch $Q_{32}$ to be turned off. In this embodiment, the fifth switch $Q_{32}$ is a P-type MOSFET, a gate of the fifth switch $Q_{32}$ receives the signal outputted by the inverter $N_{31}$, and a drain of the fifth switch $Q_{32}$ is connected to a gate of the fourth switch $Q_{31}$ and a source of the fifth switch $Q_{32}$ is connected to the ground terminal GND. Furthermore, the high-level signal enables the analog switch 303 so that the analog switch 303 outputs the signal provided by the fourth amplifier $A_{33}$, thereby accurately controlling the turning-on and turning-off of the fourth switch $Q_{31}$.

In this disclosure, the analog switch 303 may be a transmission gate (TMG), which is implemented in CMOS technology and is used to control the on and off of a signal. Its core components are a PMOS field effect transistor and an NMOS field effect transistor, and the on and off are determined by a complementary control signal.

In addition to the above circuit actions, when the working voltage VDD increases, a third voltage divided by a nineth resistor $R_{38}$ and a tenth resistor $R_{39}$ (i.e., the voltage received by the positive input terminal of the fourth amplifier $A_{33}$) also increases accordingly. Since the fourth amplifier $A_{33}$ receives the third divided voltage (through the positive input terminal) and the reference voltage (through the negative input terminal) respectively, and is used to amplify the reference voltage, wherein the amplified gain value is related to a resistor $R_{35}$, a resistor $R_{36}$, a resistor $R_{37}$, a resistor $R_{30}$, and the divided voltage, when the working voltage VDD is larger, the third divided voltage is larger so that the output terminal of the fourth amplifier $A_{33}$ outputs a high-level signal. Furthermore, when the analog switch 303 is enabled, the high-level signal turns on the fourth switch $Q_{31}$. Incidentally, if the analog switch 303 is not enabled, the high-level signal will not control the fourth switch $Q_{31}$ to be turned on. In other words, even if the signal outputted by the fourth amplifier $A_{33}$ is high-level, if the analog switch 303 is not enabled, the fourth switch $Q_{31}$ will not be turned on.

In this embodiment, the fourth switch $Q_{31}$ is a P-type MOSFET, a gate of the fourth switch $Q_{31}$ receives the signal outputted by the fourth amplifier $A_{33}$, and a drain of the fourth switch $Q_{31}$ receives the working voltage VDD and a source of the fourth switch $Q_{31}$ is connected to the ground terminal GND. Therefore, a path with extremely low impedance is formed between the working voltage VDD and the ground terminal GND, thereby generating a large current I on the conduction path to achieve the purpose of clamping the working voltage VDD.

As shown in FIG. 5B, when the working voltage VDD decreases at time t3 (especially decreases rapidly, or decreases instantaneously, the same below, no special emphasis is given) and the second divided voltage is less than the reference voltage and the first divided voltage is less than the reference voltage, the output terminal of the first comparator $A_{31}$ outputs a low-level signal, and the output terminal of the second comparator $A_{32}$ outputs a high-level signal. In this condition, the first comparator $A_{31}$ outputs a low-level signal to the S (set) input terminal of the register 302, and the second comparator $A_{32}$ outputs a high-level signal to the R (reset) input terminal of the register 302.

Since the S (set) input terminal of the register 302 receives the low-level signal and the R (reset) input terminal receives the high-level signal, the Q output terminal of the register 302 generates a low-level signal (as shown in FIG. 5B), and the low-level signal is provided to the analog switch 303 and the inverter $N_{31}$ respectively. The low-level signal generates a high-level signal through the inverter $N_{31}$ to control the fifth switch $Q_{32}$ to be turned on. Simultaneously, the low-level signal disables the analog switch 303 so that the analog switch 303 does not output the signal provided by the fourth amplifier $A_{33}$. Furthermore, although the third divided voltage increases, since the fifth switch $Q_{32}$ is turned on and grounded, a path with extremely large impedance is formed between the working voltage VDD and the ground terminal GND, thereby greatly reducing the current on this path until the current reaches zero.

In summary, the third embodiment disclosed in FIG. 5A of the present invention is implemented by the register 302 and the analog switch 303 to design a circuit that responds to rapid changes in the operating voltage VDD. That is, when the working voltage VDD increases rapidly, the first comparator $A_{31}$ generates a high-level signal and provides it to the S (set) input terminal of the register 302 to determine the conduction of the fourth switch $Q_{31}$ so that a path with extremely low impedance is formed between the working voltage VDD and the ground terminal GND, thereby generating a large current on the conduction path to achieve the purpose of clamping the working voltage VDD. On the contrary, when the working voltage VDD decreases rapidly, the second comparator $A_{32}$ generates a high-level signal provided to the R (reset) input terminal of the register 302 to determine the conduction of the fifth switch $Q_{32}$ so that a path with extremely large impedance is formed between the working voltage VDD and the ground terminal GND, thereby greatly reducing the current on this path until the current reaches zero.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. A light-emitting diode (LED) lamp comprising:

a working circuit electrically connected between a working voltage and a ground terminal, and configured to provide a power control and/or a lighting control for the LED lamp, and a voltage clamping device connected to the working circuit in parallel, and the voltage clamping device comprising:

a switch electrically connected between the working voltage and the ground terminal, wherein after the LED lamp is powered up to operate, when the working voltage is increased to exceed a reference voltage, the switch is controlled to be turned on to form a conduction path between the working voltage and ground terminal, and a large current flows through the conduction path so that the voltage clamping device is configured to clamp the working voltage of supplying power to the working circuit, wherein the voltage clamping device comprises: an analog-to-digital conversion circuit configured to receive the working voltage, and record the working voltage as the reference voltage after the working voltage is regulated, a third amplifier configured to receive the reference voltage and a divided voltage corresponding to the working voltage, and compare the divided voltage with the reference voltage to generate a switch signal, and the switch configured to receive the switch signal and controlled by the switch signal, wherein when the working voltage increases and exceeds the reference voltage, the switch signal controls the switch to be turned on so that a large current flows through the conduction path.

2. The LED lamp as claimed in claim 1, wherein the voltage clamping device comprises:

a capacitor configured to receive the working voltage and charged by the working voltage to build a capacitor voltage, and the capacitor voltage being recorded as the reference voltage after the working voltage being regulated, a first amplifier configured to receive the reference voltage and a divided voltage corresponding to the working voltage, and compare the divided voltage with the reference voltage to generate a switch signal, and the switch configured to receive the switch signal and controlled by the switch signal, wherein when the working voltage increases and exceeds the reference voltage, the switch signal controls the switch to be turned on so that a large current flows through the conduction path.

3. The LED lamp as claimed in claim 2, wherein the voltage clamping device further comprises:

a first switch coupled to the capacitor in series, and controlled by a control signal provided by the working circuit, wherein when the control signal turns on the first switch, the working voltage charges the capacitor to build the capacitor voltage.

4. The LED lamp as claimed in claim 2, wherein the voltage clamping device further comprises:

a voltage-dividing resistor network configured to receive the working voltage, and divide the working voltage to provide the divided voltage.

5. The LED lamp as claimed in claim 2, wherein the voltage clamping device further comprises:

a second amplifier configured to receive the capacitor voltage, and provide the capacitor voltage as the reference voltage after the working voltage is regulated.

6. The LED lamp as claimed in claim 1, wherein the voltage clamping device further comprises:

a voltage-dividing resistor network configured to receive the working voltage, and divide the working voltage to provide the divided voltage.

7. The LED lamp as claimed in claim 1, wherein the voltage clamping device comprises:

a constant-voltage circuit configured to receive the working voltage, and record he working voltage as the reference voltage after the working voltage is regulated, a first comparator configured to receive the reference voltage and a first divided voltage corresponding to the working voltage, and compare the first divided voltage with the reference voltage to generate a first register signal, a second comparator configured to receive the reference voltage and a second divided voltage corresponding to the working voltage, and compare the second divided voltage with the reference voltage to generate a second register signal, a register configured to receive the first register signal and the second register signal, and generate a register output signal according to the first register signal and the second register signal, and the switch configured to receive the register output signal and controlled by the register output signal, wherein when the working voltage increases and exceeds the reference voltage, the register output signal controls the switch to be turned on so that a large current flows through the conduction path.

8. The LED lamp as claimed in claim 7, wherein the voltage clamping device further comprises:

a first voltage-dividing resistor network configured to receive the working voltage, and divide the working voltage to provide the first divided voltage, and a second voltage-dividing resistor network configured to receive the working voltage, and divide the working voltage to provide the second divided voltage.

9. The LED lamp as claimed in claim 7, wherein the voltage clamping device further comprises:

a fourth amplifier configured to receive the register output signal and a second reference voltage, and compare the register output signal with the reference to generate a switch signal to control the switch.

10. The LED lamp as claimed in claim 9, wherein the voltage clamping device further comprises:

a third voltage-dividing resistor network configured to receive the working voltage, and divide the working voltage to provide the second reference voltage.

11. The LED lamp as claimed in claim 9, wherein the voltage clamping device further comprises:

an analog switch configured to receive the register output signal and the switch signal generated by the fourth amplifier, wherein when the register output signal enables the analog switch, the analog switch is configured to output the switch signal to control the switch.

12. The LED lamp as claimed in claim 7, wherein the voltage clamping device further comprises:

an inverter coupled to the register, and configured to invert the register output signal into a second switch signal, and a second switch coupled to the inverter and the switch, and the second switch being controlled by the second switch signal.

13. The LED lamp as claimed in claim 12, wherein when the working voltage is decreased to be below a reference voltage, the second switch signal turns on the second switch so that the current flowing through the conduction path to decrease significantly until it reaches zero.

14. A LED light string comprising:

a plurality of LED lamps connected in series, and each LED lamp comprising:

a working circuit electrically connected between a working voltage and a ground terminal, and configured to provide a power control and/or a lighting control for the LED lamp, and a voltage clamping device connected to the working circuit in parallel, and the voltage clamping device comprising:

a switch electrically connected between the working voltage and the ground terminal, wherein after the LED light string is powered up to operate, when the working voltage of each LED lamp of the LED light string is increased to exceed a reference voltage, the switch of the LED lamp is controlled to be turned on to form a conduction path between the working voltage and ground terminal, and a large current flows through the conduction path so that the voltage clamping device is configured to clamp the working voltage of supplying power to the working circuit of the LED lamp, wherein the voltage clamping device comprises: an analog-to-digital conversion circuit configured to receive the working voltage, and record the working voltage as the reference voltage after the working voltage is regulated, an amplifier configured to receive the reference voltage and a divided voltage corresponding to the working voltage, and compare the divided voltage with the reference voltage to generate a switch signal, and the switch configured to receive the switch signal and controlled by the switch signal, wherein when the working voltage increases and exceeds the reference voltage, the switch signal controls the switch to be turned on so that a large current flows through the conduction path.

* * * * *